(12) United States Patent
Chen et al.

(10) Patent No.: US 12,404,971 B2
(45) Date of Patent: Sep. 2, 2025

(54) BATTERY-TYPE GREASE GUN CAPABLE OF BEING LOADED WITH VARIOUS GREASE CARTRIDGES

(71) Applicant: JINGYAN MECHANICAL & ELECTRICAL TOOLS CO., LTD, JINHUA, Jinhua (CN)

(72) Inventors: Huabin Chen, Jinhua (CN); Yanqing Chen, Jinhua (CN); Meizhen Lei, Jinhua (CN)

(73) Assignee: JINGYAN MECHANICAL & ELECTRICAL TOOLS CO., LTD, JINHUA, Jinhua (CN)

( * ) Notice: Subject to any disclaimer, the term of this patent is extended or adjusted under 35 U.S.C. 154(b) by 99 days.

(21) Appl. No.: 18/240,417

(22) Filed: Aug. 31, 2023

(65) Prior Publication Data

US 2023/0408028 A1    Dec. 21, 2023

Related U.S. Application Data

(63) Continuation of application No. PCT/CN2022/121156, filed on Sep. 25, 2022.

(30) Foreign Application Priority Data

Dec. 17, 2021    (CN) .......................... 202111545607.4

(51) Int. Cl.
*F16N 5/00*    (2006.01)
(52) U.S. Cl.
CPC ..................... *F16N 5/00* (2013.01)

(58) Field of Classification Search
CPC .................................... F16N 3/12; F16N 5/00
See application file for complete search history.

(56) References Cited

U.S. PATENT DOCUMENTS

| 1,477,459 | A | * | 12/1923 | Skelly | ...................... | F16N 3/12 |
|           |   |   |         |        |                      | 222/340   |
| 1,720,890 | A | * | 7/1929  | Fesler | ...................... | F16N 3/12 |
|           |   |   |         |        |                      | 188/78    |

(Continued)

FOREIGN PATENT DOCUMENTS

| CN | 2191347 Y | 3/1995 |
| CN | 2288336 Y | 8/1998 |

(Continued)

OTHER PUBLICATIONS

European search report of EP22905491.1.
International Search Report of PCT/CN2022/121156.

*Primary Examiner* — Minh Truong

(57) ABSTRACT

A battery-type grease gun capable of being loaded with various grease cartridges is provided. The battery grease gun includes a main body shell. A convergence base and a grease cylinder are provided at a bottom of the main body shell. The grease cylinder is provided with a push rod and a grease cylinder rotary cover. The push rod is provided with a handle, and the handle is connected to a thin and long pull rod. The pull rod extend through a center hole of the grease cylinder rotary cover. A terminal of the end of the pull rod away from the grease cylinder rotary cover is provided with a cylindrical pin, and an opening configured to allow the cylindrical pin to extend through is provided at a center of the outer pressing plate of the sealing ring.

4 Claims, 4 Drawing Sheets

(56) References Cited

U.S. PATENT DOCUMENTS

| | | | |
|---|---|---|---|
| 2,394,488 A * | 2/1946 | Rotter | F16N 3/12 |
| | | | 222/340 |
| 3,038,768 A | 6/1962 | Kludt | |
| 4,247,023 A | 1/1981 | Shew | |
| 4,257,540 A | 3/1981 | Wegmann et al. | |
| 5,884,818 A | 3/1999 | Campbell | |
| 10,914,422 B2 * | 2/2021 | Kawai | F16N 13/02 |
| 2010/0294808 A1 | 11/2010 | He et al. | |
| 2013/0087583 A1 | 4/2013 | Thorson et al. | |

FOREIGN PATENT DOCUMENTS

| | | |
|---|---|---|
| CN | 101893159 A | 11/2010 |
| CN | 202769228 U | 3/2013 |
| CN | 205155516 U | 4/2016 |
| CN | 213207222 U | 5/2021 |
| CN | 114135781 A | 3/2022 |
| CN | 216520841 U | 5/2022 |
| JP | 2019203463 A | 11/2019 |

\* cited by examiner

BATTERY-TYPE GREASE GUN CAPABLE OF BEING LOADED WITH VARIOUS GREASE CARTRIDGES

CROSS-REFERENCE TO RELATED APPLICATIONS

This application is a continuation of international patent application No. PCT/CN2022/121156, filed on Sep. 25, 2022, which itself claims priority to Chinese patent application No. 202111545607.4, filed on Dec. 17, 2021. The contents of the above identified applications are hereby incorporated herein in their entireties by reference.

TECHNICAL FIELD

The present disclosure relates to the field of electric tools, in particular to a battery-type grease gun capable of being loaded with various grease cartridges.

BACKGROUND

A battery-type grease gun is an electric tool configured to fill grease for lubricating a machine, and is wildly used. Currently, the grease can be classified into three kinds according to the method the grease is packaged: bulk grease, simple grease cartridge (commonly known as a caterpillar-shaped grease cartridge) and sealed can-type grease cartridge. The battery-type grease guns in the market are generally suitable for the bulk grease and the simple grease cartridge. When the bulk grease is loaded in the battery-type grease gun, a grease cylinder of the battery-type grease gun is removed, and the grease is sucked up into the grease cylinder by a push rod disposed in the grease cylinder. When the simple grease cartridge is loaded in the battery-type grease gun, the simple grease cartridge can be loaded in the grease cylinder directly due to the simple grease cartridge is packaged with a cylinder-shaped flexible plastic. However, the sealed can-type grease cartridge is packaged with a rigid material cylinder, which includes a plastic end cap at one end and a metal easy open cap at the other end. When the sealed can-type grease cartridge is disposed in the grease cylinder of the battery-type grease gun in the related art, a sealing ring at a front end of the push rod cannot be squeezed into the grease cylinder. Even the sealing ring is squeezed into the grease cylinder, the sealing ring may deform and cannot seal the grease cylinder any more. Thus, the battery-type grease gun in the related art cannot load the bulk grease, the simple grease cartridge and the sealed can-type grease cartridge at the same time.

SUMMARY

An object of the present disclosure is to solve the problems above and provide a battery-type grease gun capable of loading various kinds of grease cartridges. By providing a sealing ring in a bowl-shaped structure, providing an inner pressing plate of the sealing ring and a support frame of the sealing ring at an inner side of the sealing ring and providing an outer pressing plate of the sealing ring at an outer side of the sealing ring, respectively, a cylinder-shaped package of a sealed can-type grease cartridge can be squeezed into by the sealing ring while the sealing ring do not deform. Thus, the grease gun is capable of loading various kinds of grease cartridge.

A battery-type grease gun capable of being loaded with various grease cartridges. The battery-type grease gun capable of being loaded with various grease cartridges includes a main body shell. A holder is provided at a top of the main body shell, and a rear of the holder is provided with a battery mounting base configured to install a battery pack. A motor, a transmission mechanism connecting with the motor and a plunger connecting with the transmission mechanism are provided inside the main body shell. A convergence base and a grease cylinder are provided at a bottom of the main body shell. An end of the grease cylinder is matched with the convergence base by threaded connection, and the other end of the grease cylinder is provided with a grease cylinder rotary cover by threaded connection. The main body shell further includes a ring-shaped support configured to fix the grease cylinder. A port of the convergence base is provided with a grease nozzle. The grease nozzle is connected to and in communication with an outlet tube. The plunger is driven by the motor to reciprocate and squeeze grease in the convergence base, so that the grease spurts out from the grease nozzle and gets into the outlet tube. The grease cylinder is provided with a push rod. The push rod is provided with a handle, and the handle is connected to a thin and long pull rod. The pull rod extends through a center hole of the grease cylinder rotary cover. An end of the pull rod away from the grease cylinder rotary cover is provided with a sealing ring. An inner side of the sealing ring is provided with an inner pressing plate of the sealing ring and a support frame of the sealing ring, respectively. An outer side of the sealing ring is provided with a washer and an outer pressing plate of the sealing ring. A compression spring is provided between the support frame of the sealing ring and the grease cylinder rotary cover. At least one set of fixing holes are symmetrically disposed on the sealing ring, the inner pressing plate of the sealing ring, the outer pressing plate of the sealing ring along a circumference around an axis of the sealing ring, respectively. At least one set of connecting members extend through the at least one set of fixing holes to connect the sealing ring, the inner pressing plate of the sealing ring, and the outer pressing plate of the sealing ring together. A terminal of the end of the pull rod away from the grease cylinder rotary cover is provided with a cylindrical pin, and an opening configured to allow the cylindrical pin to extend through is provided at a center of the outer pressing plate of the sealing ring.

In some embodiments, the connecting member is a rivet.

In some embodiments, the connecting member includes a nut and a screw.

In some embodiments, the sealing ring is a bowl-shaped structure made of rubber. A thickness at an edge of the sealing ring is less than a thickness of a middle of the sealing ring, and a diameter of the sealing ring is greater than an inner diameter of the grease cylinder.

In some embodiments, the pull rod is provided with a limiting groove, a limiting hole is provided adjacent to the center hole of the grease cylinder rotary cover, and a diameter of the limiting hole is less than a diameter of the pull rod and greater than a diameter of the limiting groove.

In some embodiments, the grease cylinder rotary cover is provided with at least one air vent.

The present disclosure has the following benefits. Firstly, by providing a sealing ring in a bowl-shaped structure, providing an inner pressing plate of the sealing ring and a support frame of the sealing ring at an inner side of the sealing ring and providing an outer pressing plate of the sealing ring at an outer side of the sealing ring, respectively, a cylinder-shaped package of a sealed can-type grease cartridge can be squeezed into the sealing ring while the sealing ring do not deform. Thus, the grease gun is capable of loading various kinds of grease cartridge. Secondly, in a push rod, a terminal of the end of the pull rod away from the grease cylinder rotary cover is provided with a cylindrical pin, and an opening configured to allow the cylindrical pin to extend through is provided at a center of the outer pressing plate of the sealing ring. When the grease gun is in operation, the cylindrical pin can be fixed between the outer pressing plate of the sealing ring and the washer. The amount of residual grease can be shown according to a length of the pull rod exposed outside of the grease cylinder. Besides, the cylindrical pin can be rotated and extend out from the opening on the outer pressing plate of the sealing ring and recover back to the bottom of the grease cylinder, thereby reducing space occupied by the battery-type grease gun and facilitating operation of the battery-type grease gun.

In the figures, 1 represents a main body shell; 2 represents a holder; 3 represents a battery mounting base; 4 represents a battery pack; 5 represents a convergence base; 6 represents a grease cylinder; 7 represents a ring-shaped support; 8 represents a grease nozzle; 9 represents an outlet tube; 10 represents a grease cylinder rotary cover; 11 represents a handle; 12 represents a pull rod; 13 represents a compression spring; 14 represents a support frame of the sealing ring; 15 represents a connecting member; 16 represents an inner pressing plate of the sealing ring; 17 represents a sealing ring; 18 represents a washer; 19 represents an outer pressing plate of the sealing ring; 20 represents a cylindrical pin; 21 represents a limiting groove; 22 represents a fixing hole; 23 represents a limiting hole; 24 represents an air vent; 25 represents a cylinder-shaped package of a sealed can-type grease cartridge; 26 represents a cylinder-shaped package of a simple grease cartridge; 27 represents a motor; 28 represents a transmission mechanism; 29 represents a plunger; 30 represents a push rod; 31 represents a center hole of the grease cylinder rotary cover; and 32 represents an opening of the outer pressing plate.

DETAILED DESCRIPTION

In order to better understand the present disclosure, preferred embodiments of the present disclosure are described in detail below in conjunction with the accompanying drawings. It should be understood by those skilled in the art that these exemplary embodiments do not imply any limitation on the form of the present disclosure.

Figure 1:
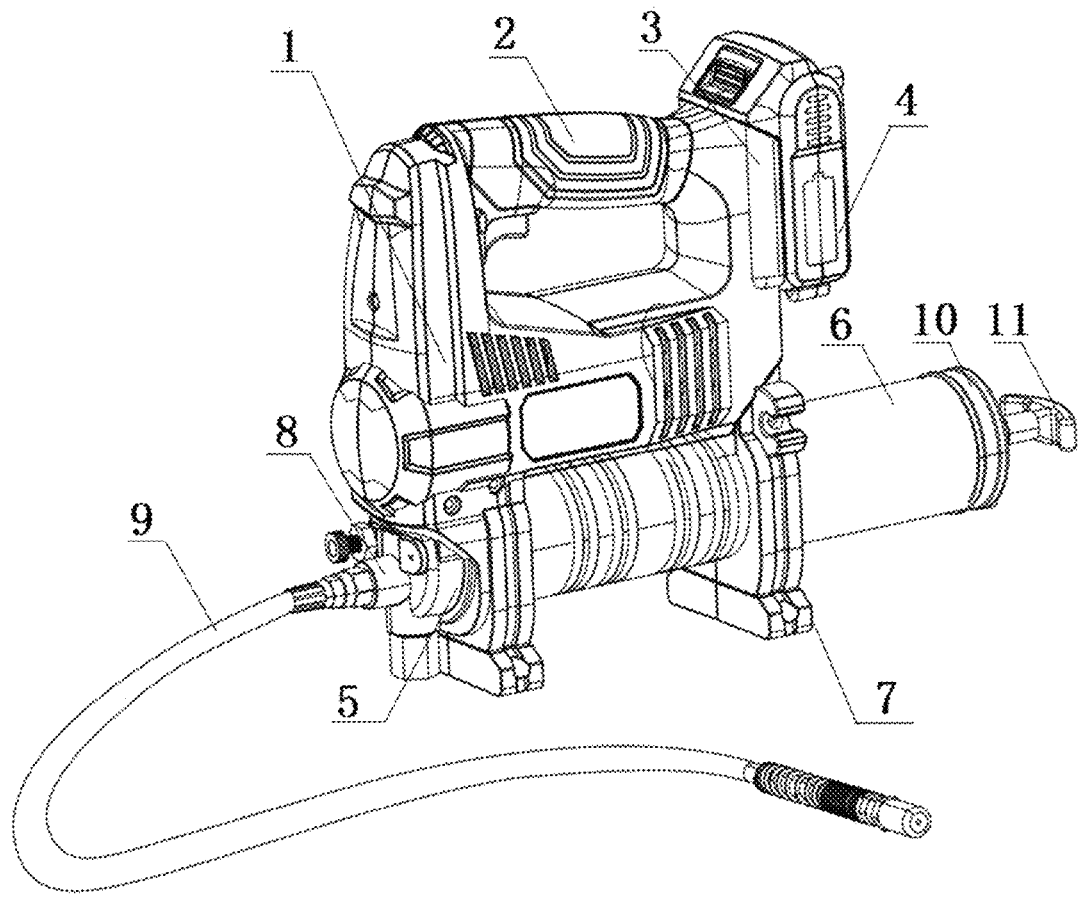
FIG. 1 is a structural schematic diagram of a battery-type grease gun provided in the present disclosure.
Figure 2:
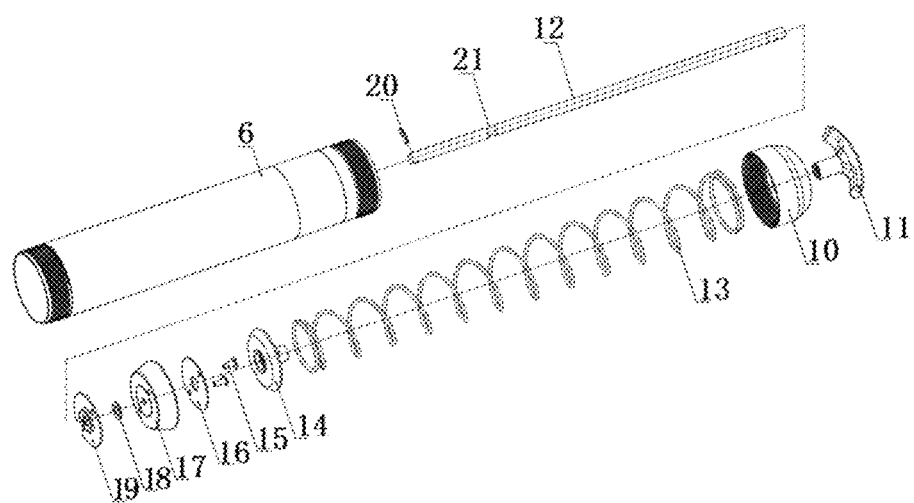
FIG. 2 is a structural schematic diagram of a push rod provided in the present disclosure.
Figure 3:
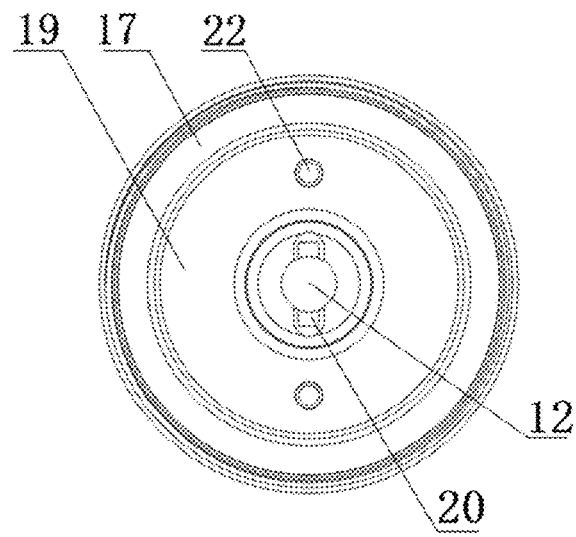
FIG. 3 is a front view of the sealing ring provided by the present disclosure, in which the cylindrical pin is disposed outside the outer pressing plate of the sealing ring.
Figure 4:
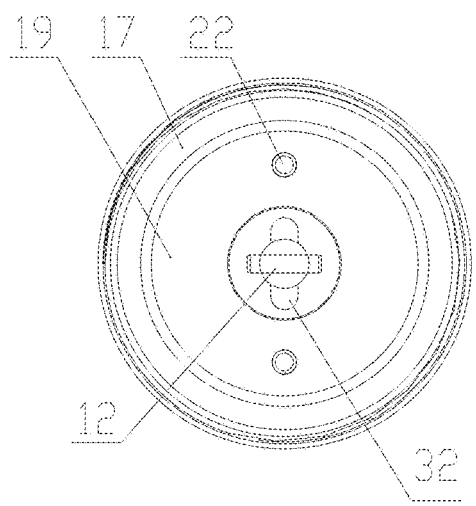
FIG. 4 is a front view of the sealing ring provided by the present disclosure, in which the cylindrical pin is disposed inside the outer pressing plate of the sealing ring.
Figure 5:
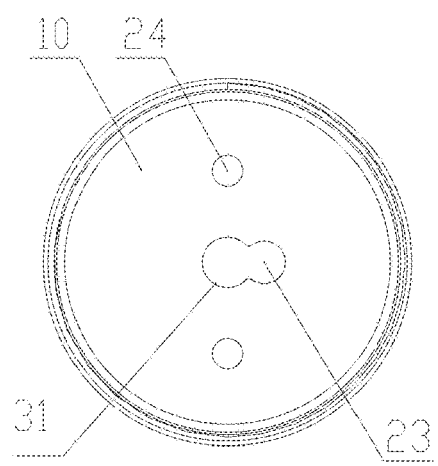
FIG. 5 is a front view of a grease cylinder cover provided in the present disclosure.
Figure 6:
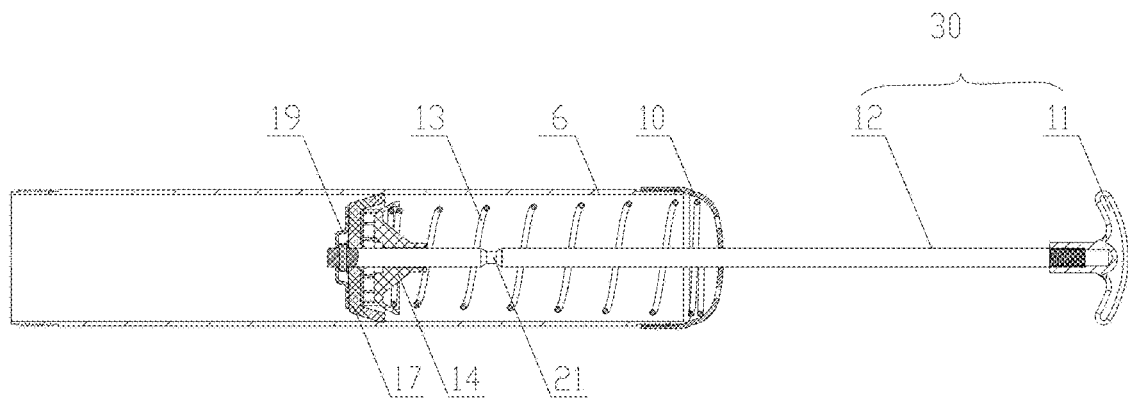
FIG. 6 is a sectional view of a grease cylinder in the present disclosure, in which the grease cylinder is loaded with bulk grease and the pull rod is not recovered.
Figure 7:
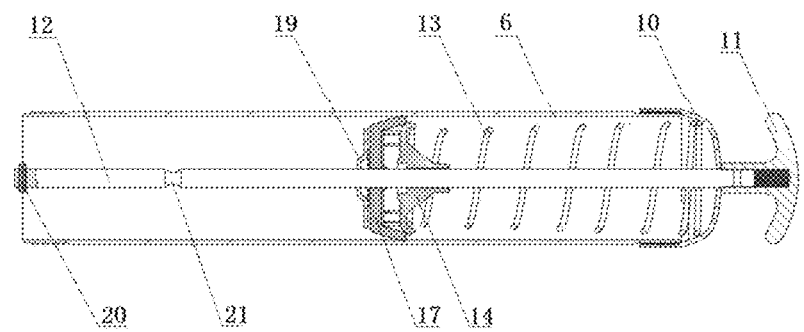
FIG. 7 is a sectional view of a grease cylinder in the present disclosure, in which the grease cylinder is loaded with bulk grease and the pull rod is recovered.
Figure 8:
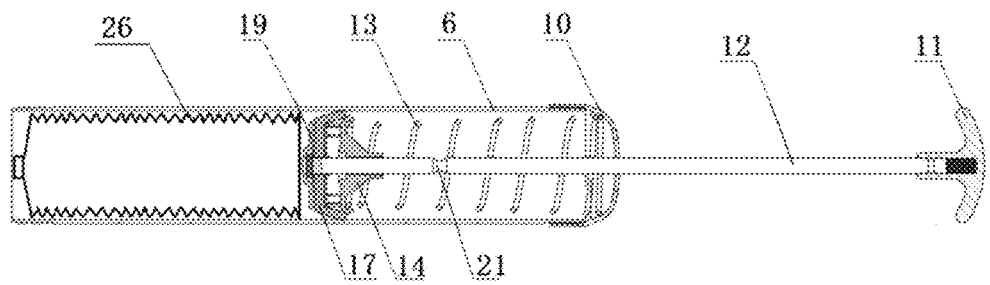
FIG. 8 is a sectional view of a grease cylinder in the present disclosure, in which the grease cylinder is loaded with a simple grease cartridge.
Figure 9:
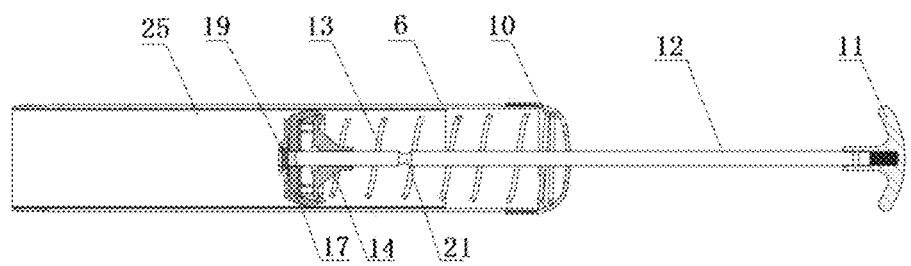
FIG. 9 is a sectional view of a grease cylinder in the present disclosure, in which the grease cylinder is loaded with a sealed can-type grease cartridge and the pull rod is not recovered.
Figure 10:
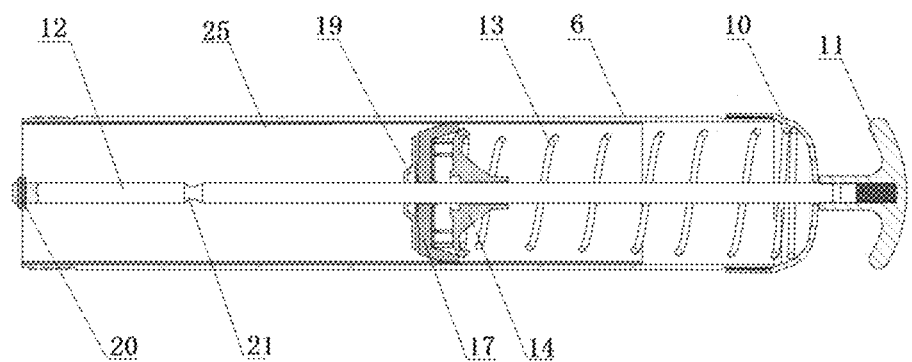
FIG. 10 is a sectional view of a grease cylinder in the present disclosure, in which the grease cylinder is loaded with a sealed can-type grease cartridge and the pull rod is recovered.
Figure 11:
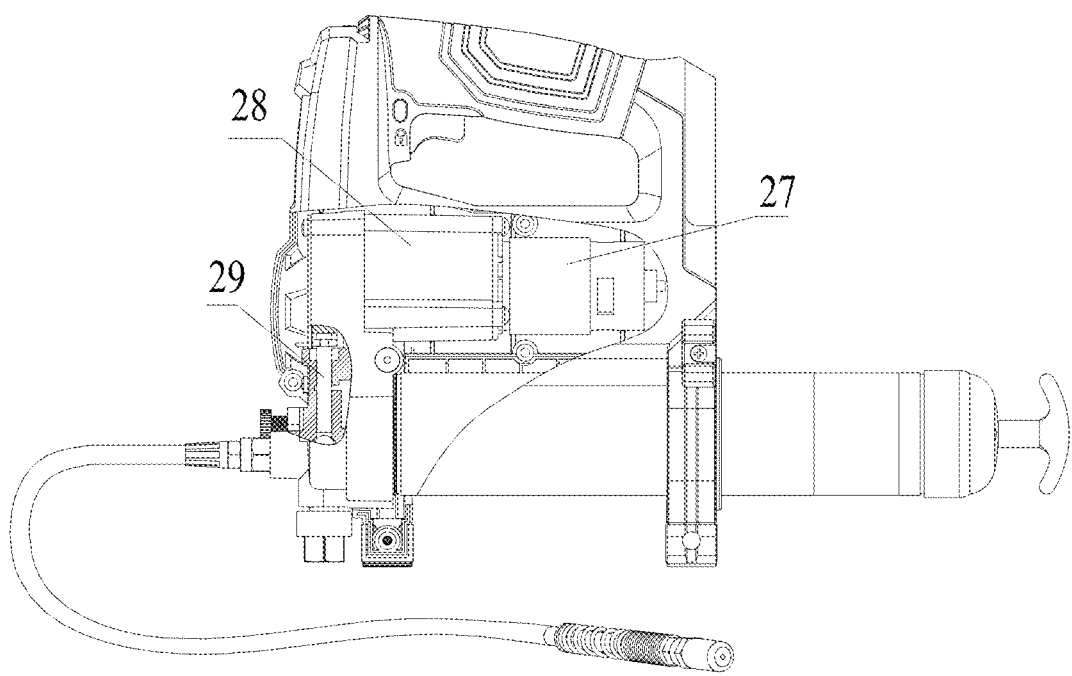
FIG. 11 is a structural schematic diagram of a battery-type grease gun provided in the present disclosure.

Referring to FIG. 1 to FIG. 10, a battery-type grease gun capable of being loaded with various grease cartridges is provided. The battery-type grease gun capable of being loaded with various grease cartridges includes a main body shell 1. A holder 2 is provided at a top of the main body shell 1, and a rear of the holder 2 is provided with a battery mounting base 3 configured to install a battery pack 4. The battery pack 4 can be replaced easily. A motor 27, a transmission mechanism 28 connecting with the motor 27 and a plunger 29 connecting with the transmission mechanism 28 are provided inside the main body shell 1. The battery pack 4 can provide a power supply to drive the motor 27, thereby driving the plunger 29 to reciprocate and continuously squeeze the grease. A convergence base 5 and a grease cylinder 6 are provided at a bottom of the main body shell 1. The grease cylinder 6 is configured to store the grease. An end of the grease cylinder 6 is matched with the convergence base 5 by threaded connection, and the other end of the grease cylinder 6 is provided with a grease cylinder rotary cover 10 by threaded connection. The main body shell 1 further includes a ring-shaped support 7 configured to fix the grease cylinder 6. A port of the convergence base 5 is provided with a grease nozzle 8. The grease nozzle 8 is connected to and in communication with an outlet tube 9. The plunger 29 reciprocates and squeezes the grease in the convergence base 5, so that the grease spurts out from the grease nozzle 8 and gets into the outlet tube 9.

In order to continuously push the grease into the convergence base 5, the grease cylinder 6 is provided with a push rod 30. The push rod 30 is provided with a handle 11 configured to allow a user to operate. The handle 11 is connected to a thin and long pull rod 12. The pull rod 12 extends through a center hole 31 of the grease cylinder rotary cover 10. An end of the pull rod 12 away from the grease cylinder rotary cover 10 is located inside the grease cylinder 6 and provided with a sealing ring 17. An inner side of the sealing ring 17 is provided with an inner pressing plate 16 of the sealing ring 17 and a support frame 14 of the sealing ring 17, respectively. An outer side of the sealing ring 17 is provided with a washer 18 and an outer pressing plate 19 of the sealing ring 17. At least one set of fixing holes 22 are symmetrically disposed on the sealing ring 17, the inner pressing plate 16 of the sealing ring 17, the outer pressing plate 19 of the sealing ring 17 along a circumference around an axis of the sealing ring 17, respectively. At least one set of connecting members extend through the at least one set of fixing holes 22 to connect the sealing ring 17, the inner pressing plate of the sealing ring 17, and the outer pressing plate 19 of the sealing ring 17 together.

In some embodiments, the connecting member 15 can be a rivet. It could be understood that in some embodiments, the connecting member 15 can further include a nut and a screw.

In some embodiments, the sealing ring 17 can be a bowl-shaped structure made of rubber. A thickness at an edge of the sealing ring 17 can be less than a thickness of a middle of the sealing ring 17, and a diameter of the sealing ring 17 can be greater than an inner diameter of the grease cylinder 6. Therefore, sealing requirement of the grease cylinder 6 can be met.

A compression spring 13 is provided between the support frame 14 of the sealing ring 17 and the grease cylinder rotary cover 10. The compression spring 13 can apply a force to the grease in the grease cylinder 6 and push the grease in the grease cylinder 6 into the convergence base 5 via the support frame of the sealing ring 14.

Furthermore, a terminal of the end of the pull rod 12 away from the grease cylinder rotary cover 10 is provided with a cylindrical pin 20, and an opening configured to allow the cylindrical pin 20 to extend through is provided at a center of the outer pressing plate 19 of the sealing ring 17. The opening is in a strip-shaped structure. A size of the opening is greater than the cylindrical pin 20. Therefore, the cylindrical pin 20 can align with the opening 32 of the outer pressing plate 19 of the sealing ring 17 by rotating the handle 11, extend through the opening 32 of the outer pressing plate 19 of the sealing ring 17 and rotate to define an angle of 90 degrees between an opening 32 of the outer pressing plate 19 and the cylindrical pin 20. Thus the cylindrical pin 20 can be locked between the washer 18 and the outer pressing plate 19 of the sealing ring 17, so that the pull rod 12 can be fixed with the sealing ring 17. On the contrary, the cylindrical pin 20 can align with the opening 32 of the outer pressing plate 19 of the sealing ring 17 by rotating the handle 11, extend out of the opening 32 of the outer pressing plate 19 of the sealing ring 17, and the pull rod 12 can move freely between the bottom of the grease cylinder and the sealing ring 17.

Furthermore, the pull rod 12 can be provided with a limiting groove 21, and a limiting hole 23 can be provided adjacent to the center hole 31 of the grease cylinder rotary cover 10. A diameter of the limiting hole 23 can be less than a diameter of the pull rod 12 and greater than a diameter of the limiting groove 21. Therefore, when the limiting groove is clamped into the limiting hole 23, a position of the pull rod 12 can be fixed. The grease cylinder rotary cover 10 can be provided with at least one air vent 24. In a process of pulling the pull rod 12, the air vent 24 can be configured to discharge air between the sealing ring 17 and the grease cylinder rotary cover 10.

In case that the grease cylinder 6 is loaded with bulk grease, the cylindrical pin firstly extend through the opening 32 of the outer pressing plate 19 of the sealing ring 17 and is fixed with the sealing ring 17. Then the sealing ring 17 is disposed at a bottom of the grease cylinder 6, and the bottom of the grease cylinder 6 is immersed in the bulk grease. Thereafter, the handle 11 is pulled up, so as to slowly pull the sealing ring 17 towards a top of the grease cylinder 6. In the process, the bulk grease is sucked into the grease cylinder 6, and both the air vent 24 on the cylinder rotary cover 10 and the limiting hole 23 can discharge the air out. When the compression spring 13 is compressed by the sealing ring 17 to an extreme position, the pull rod 12 is shaken by the handle 11, so that the limiting groove 21 is clamped in to the limiting 23 to fix the push rod 30. The grease cylinder 6 is disposed on the convergence base 5. Then the limiting groove 21 is separated from the limiting hole 23 and loading of the bulk grease is completed. Thereafter, the cylindrical pin can be left in the outer pressing plate 19 of the sealing ring 17, so that a length of the pull rod 12 exposed outside the grease cylinder 6 can show the amount of the residual grease. The cylindrical pin 20 can also separate from the outer pressing plate 19 of the sealing ring 17, so that the pull rod 12 can be recovered to the bottom of the grease cylinder 6, thereby reducing the space occupied by the grease gun and facilitating operation of the grease gun.

In case that the grease cylinder 6 is loaded with a simple grease cartridge, the cylindrical pin 20 firstly extend through the opening 32 of the outer pressing plate 19 of the sealing ring 17 and is fixed with the sealing ring 17. Then the sealing ring 17 is pulled to a top of the grease cylinder 6 with the handle 11. The pull rod 12 is shaken to clamp the limiting groove 21 into the limiting hole 23, so as to fix the push rod 30. Then the simple grease cartridge is loaded in the grease cylinder 6. The grease cylinder 6 can be mounted on the convergence base 5. Then the limiting groove 21 can be separated from the limiting hole 23 to complete the loading of the caterpillar of the-shaped grease.

In case that the grease cylinder 6 is loaded with a sealed can-type grease cartridge, the cylindrical pin 20 firstly extend through the opening 32 of the outer pressing plate 19 of the sealing ring 17 and is fixed with the sealing ring 17. Then the sealing ring 17 is pulled to a top of the grease cylinder 6 with the handle 11. The pull rod 12 is shaken to clamp the limiting groove 21 into the limiting hole 23, so as to fix the push rod 30. Then a plastic end cap and an easy open cap at both ends of the sealed can-type grease cartridge are removed, and the sealed can-type grease cartridge is loaded in the grease cylinder 6 according to a direction shown on a package of the sealed can-type grease cartridge. The grease cylinder 6 can be mounted on the convergence base 5. Then the limiting groove 21 can be separated from the limiting hole 23, and the handle 11 is pushed toward the bottom of the grease cylinder 6, so as to squeeze the sealing ring 17 into a cylinder-shaped package of a sealed can-type grease cartridge 25 to complete the loading of the sealed can-type grease cartridge. At this time, the structure of the sealing ring 17 allows the edge of the sealing ring 17 to deform while the total structure of the sealing ring 17 is stable and the sealing requirement of the sealing ring 17 can be met. Finally, the cylindrical pin 20 can be left in the outer pressing plate 19 of the sealing ring 17, so that a length of the pull rod 12 exposed outside the grease cylinder 6 can show the amount of the residual grease. The cylindrical pin 20 can also separate from the outer pressing plate 19 of the sealing ring 17, so that the pull rod 12 can be recovered to the bottom of the grease cylinder 6, thereby reducing the space occupied by the grease gun and facilitating operation of the grease gun.

In addition to the above preferred embodiments, there are other embodiments of the present disclosure, and the person skilled in the art may make various changes and deformations in accordance with the present invention, and as long as they do not deviate from the spirit of the present invention, they shall all fall within the scope as defined in the appended claims of the present invention.

What is claimed is:

1. A battery-type grease gun capable of being loaded with various grease cartridges, comprising
 a main body shell,
  wherein a holder is provided at a top of the main body shell, and a rear of the holder is provided with a battery mounting base configured to install a battery pack,
 a motor, a transmission mechanism connecting with the motor and a plunger connecting with the transmission mechanism are provided inside the main body shell,
 a convergence base and a grease cylinder are provided at a bottom of the main body shell, an end of the grease cylinder is matched with the convergence base by threaded connection, the other end of the grease cylinder is provided with a grease cylinder rotary cover by threaded connection, the main body shell further comprises a ring-shaped support, wherein the ring-shaped support is configured to fix the grease cylinder, a port of the convergence base is provided with a grease nozzle, the grease nozzle is connected to and in communication with an outlet tube, the plunger is driven by the motor to reciprocate and squeeze grease in the convergence base, so that the grease spurts out from the grease nozzle and gets into the outlet tube, wherein the grease cylinder is provided with a push rod, the push rod is provided with a handle, the handle is connected to a thin and long pull rod, the pull rod extends through a center hole of the grease cylinder rotary cover, an end of the pull rod away from the grease cylinder rotary cover is provided with a sealing ring, an inner side of the sealing ring is provided with an inner pressing plate of the sealing ring and a support frame of the sealing ring, respectively, an outer side of the sealing ring is provided with a washer and an outer pressing plate of the sealing ring, a compression spring is provided between the support frame of the sealing ring and the grease cylinder rotary cover, the inner pressing plate of the sealing ring is separate from the support frame, and the washer is separate from the outer pressing plate of the sealing ring, at least one set of fixing holes are symmetrically disposed on the sealing ring, the inner pressing plate of the sealing ring, the outer pressing plate of the sealing ring along a circumference around an axis of the sealing ring, respectively, at least one set of connecting members extend through the at least one set of fixing holes to connect the sealing ring, the inner pressing plate of the sealing ring, and the outer pressing plate of the sealing ring together, a terminal of the end of the pull rod away from the grease cylinder rotary cover is provided with a cylindrical pin, and an opening configured to allow the cylindrical pin to extend through is provided at a center of the outer pressing plate of the sealing ring, the sealing ring is a bowl-shaped structure made of rubber, a thickness at an edge of the sealing ring is less than a thickness of a middle of the sealing ring, and a diameter of the sealing ring is greater than an inner diameter of the grease cylinder, and the grease cylinder rotary cover is provided with at least one air vent, and the at least one air vent is spaced from the center hole.

2. The battery-type grease gun of claim 1, wherein the connecting member is a rivet.

3. The battery-type grease gun of claim 1, the connecting member comprises a nut and a screw.

4. The battery-type grease gun of claim 1, wherein the pull rod is provided with a limiting groove, a limiting hole is provided adjacent to the center hole of the grease cylinder rotary cover, and a diameter of the limiting hole is less than a diameter of the pull rod and greater than a diameter of the limiting groove.

* * * * *